US006755093B2

(12) United States Patent
Bennett et al.

(10) Patent No.: US 6,755,093 B2
(45) Date of Patent: Jun. 29, 2004

(54) PLANETARY DRIVE ASSEMBLY WITH IDLERS FOR LOW FLOOR VEHICLE

(75) Inventors: John L. Bennett, Fraser, MI (US); Chihping Kuan, Rochester Hills, MI (US); John K. Ma, Rochester, MI (US); William C. Sullivan, Newark, OH (US); Edward J. Eshelman, Rochester Hills, MI (US); Dean M. House, Pataskala, OH (US); Tomaz Dopico Varela, Gahanna, OH (US); Mark C. Smith, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 15 days.

(21) Appl. No.: 10/059,448

(22) Filed: Jan. 29, 2002

(65) Prior Publication Data

US 2003/0140717 A1 Jul. 31, 2003

(51) Int. Cl.[7] .............................................. F16H 55/17
(52) U.S. Cl. ............................ 74/438; 74/390; 180/371
(58) Field of Search .................... 74/390, 438; 180/371

(56) References Cited

U.S. PATENT DOCUMENTS

| | | | | |
|---|---|---|---|---|
| 305,648 A | * | 9/1884 | Whitney | 74/438 |
| 3,039,417 A | | 6/1962 | Bixby | |
| 4,448,092 A | * | 5/1984 | Binger | 74/390 |
| 4,896,740 A | * | 1/1990 | Hueckler et al. | 180/255 |
| 6,540,632 B1 | * | 4/2003 | Wendl et al. | 475/5 |

FOREIGN PATENT DOCUMENTS

| | | |
|---|---|---|
| DE | 846 856 | 8/1952 |
| DE | 1455654 | 5/1972 |
| DE | 19932587 | 1/2001 |
| GB | 1457979 | 12/1976 |
| WO | WO 97 28980 | 8/1997 |

* cited by examiner

Primary Examiner—David Fenstermacher
(74) Attorney, Agent, or Firm—Carlson, Gaskey & Olds

(57) ABSTRACT

A drive axle assembly for a low floor vehicle utilizes a single input gear assembly to drive a pair of laterally spaced wheel ends. The input gear assembly is positioned next to one of the wheel ends so that the vehicle floor can be lowered to facilitate passenger access to the vehicle. Each wheel end includes a gear reduction assembly with a ring gear rotatably mounted within a gear housing. A drive gear is operatively coupled to the input gear assembly and is in meshing engagement with the ring gear. The gear reduction assembly also includes an output or driven gear, which is larger than the drive gear, to provide the desired gear reduction. The driven gear is also in meshing engagement with the ring gear. A pair of idler gears is rotatably mounted within the gear housing and are in meshing engagement with both the drive and driven gear. The idler gears and drive gear do not have a common centerline. The assembly thus provides toothed contact via three gear sets combinations, which equalizes loading and eliminates the need for support bearings for the drive and driven gears.

28 Claims, 3 Drawing Sheets

PLANETARY DRIVE ASSEMBLY WITH IDLERS FOR LOW FLOOR VEHICLE

BACKGROUND OF THE INVENTION

This invention relates to drive unit assembly for a vehicle having a drive axle with a gear reduction assembly.

Gear reduction assemblies are used in many different types of vehicles to provide a desired drive torque and speed output at a vehicle wheel. Heavy-duty off-road vehicles such as lift trucks, container handles, rough terrain cranes, front end loaders, mining trucks, log haulers, etc., often require significant reductions in order to achieve high output torque at the wheel for adverse ground conditions. Other vehicles such as commercial on-highway hauling trucks, garbage trucks, buses, etc. that have the capability of hauling heavy loads also often require a gear reduction assembly to achieve a desired wheel output torque.

One type of reduction gear assembly is a planetary gear reduction assembly, which includes an internally toothed ring gear, a sun gear that is centrally positioned within the ring gear, and a plurality of planet gears in meshing engagement with both the sun and ring gears. The planet gears are mounted on a common planetary spider carrier that turns about the centerline defined by the sun gear. A reduction occurs because the sun gear has a fewer number of gear teeth than the ring gear. This planetary gear reduction assembly provides high power density in a very compact package and does not require support bearings for the input and output components. However, one disadvantage with this gear configuration is the input and output components are required to be concentric, thus this configuration cannot be used in applications that have inputs and outputs on different centerlines.

One type of reduction gear assembly for a non-concentric input/output configuration utilizes an input drive gear in meshing engagement with an output drive gear. Typically, the gears used in this configuration are required to be large in size because there is only one tooth set in contact. Further, the gears are rigidly mounted between bearings, which further increases the packaging area needed for the gear reduction components.

Another type of reduction gear assembly for a non-concentric input/output configuration utilizes a helical gear assembly with idler gears to carry higher loads for smaller gears. This gear configuration is used in axles for mass transit vehicle applications. Mass transit vehicles, such as trolley cars, buses, and the like, typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers, as well as for children.

Many such mass transit vehicles provide a rigid axle having an input positioned off-center near one wheel end to form an inverted portal axle configuration. The input is coupled to a driveshaft, which is powered by a vehicle engine and transmission. Due to the low floor configuration, the input to the axle is below the driving axis of rotation for the wheel ends. The helical gear assembly is used to transfer driving torque from the lower input position to the higher output position, as well as providing a desired gear reduction.

Traditionally, the helical gear assembly includes a helical pinion gear that is operatively coupled to a ring and pinion gear at the axle input and a helical driven gear that drives the associated wheel hub. A pair of idler gears is in meshing engagement with both the helical pinion and driven gears. This configuration, utilizing two (2) idler gears, can carry higher loads because there are two (2) tooth set contacts. However, this configuration is limited to close centerline mountings because the helical pinion gear and both idler gears are on the same centerline.

Accordingly, it is desirable to provide a gear reduction assembly that utilizes the high power density and packaging benefits of a planetary gear reduction but which can be incorporated into an axle with non-concentric input and output components. Further, it is desirable to package this improved gear reduction assembly into a portal axle configuration to provide an improved low floor profile to facilitate access to the vehicle as well as overcoming the other deficiencies in the art outlined above.

SUMMARY OF THE INVENTION

A drive axle includes a reduction gear assembly at each wheel end to drive vehicle wheels. The reduction gear assembly receives an input load from a vehicle driveline and transfers the load to an output at the vehicle wheel. The input and output to the gear reduction assembly are non-concentric. The gear reduction assembly includes an internally toothed ring gear that is rotatably supported within a gear housing. A drive gear, operatively coupled to the input, is in meshing engagement with the ring gear. A driven gear, operatively coupled to the output, is also in meshing engagement with the ring gear. The ring gear, drive gear, and driven gear are non-concentric. An idler gear assembly is interposed between the drive and driven gear to transfer load from the drive gear to the driven gear. The driven gear is larger than the drive gear to provide the desired gear reduction. The drive and driven gears run on the pitch line of the ring and idler gears such that the load is equally distributed amongst the gears, eliminating the need for support bearings for the drive and driven gears.

In the preferred embodiment, the idler gear assembly includes a pair of idler gears that are in meshing engagement with both the drive and driven gears. The drive gear defines a drive gear centerline and the idler gears define a common idler gear centerline that is spaced apart from and parallel to the drive gear centerline. The driven gear defines a driven gear centerline that is spaced apart from and parallel to the idler and drive gear centerlines.

The subject invention provides a gear reduction configuration that allows the distance between the drive and driven gear centerlines to be increased over traditional configurations because the drive gear centerline is below the idler gear centerline. Further, this configuration is one-third the size of traditional gear sets because three tooth sets are in contact. The subject invention provides smaller more compact gear reductions resulting in an improved low floor profile to facilitate access to a vehicle while still providing sufficient driving torque to the wheels. These and other features of the present invention can be best understood from the following specifications and drawings, the following of which is a brief description.

DETAILED DESCRIPTION OF A PREFERRED EMBODIMENT

Figure 1:
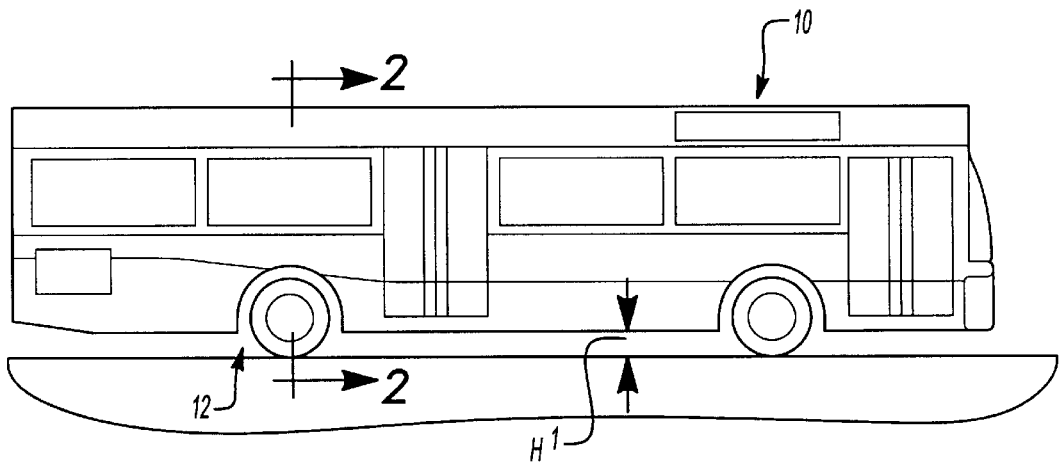
FIG. 1 is side view of a vehicle incorporating a prior art drive unit assembly.

A vehicle 10 incorporating a traditional inverted portal axle 12 is shown in FIG. 1. The inverted portal axle 12 includes a pair of wheel end assemblies 14 interconnected by an axle housing 16, shown in FIG. 2. An input 18 is positioned near one of the wheel end assemblies 14 and an axle shaft 20 connects the input 18 to the other wheel end assembly 14. A helical gear reduction assembly 22 is mounted to each wheel end assembly 14 to transfer load from the input 18 to the wheels.

The inverted portal axle 12 defines a floor profile having a height H1 between a vehicle floor 24 and ground 26. Currently, components such as the axle housing 16 and helical gear reduction assemblies 22 limit this height H1. Traditionally, this height H1 is approximately 400 mm near the front of the vehicle and is 450 mm over the rear inverted portal axle 12.

Figure 3:
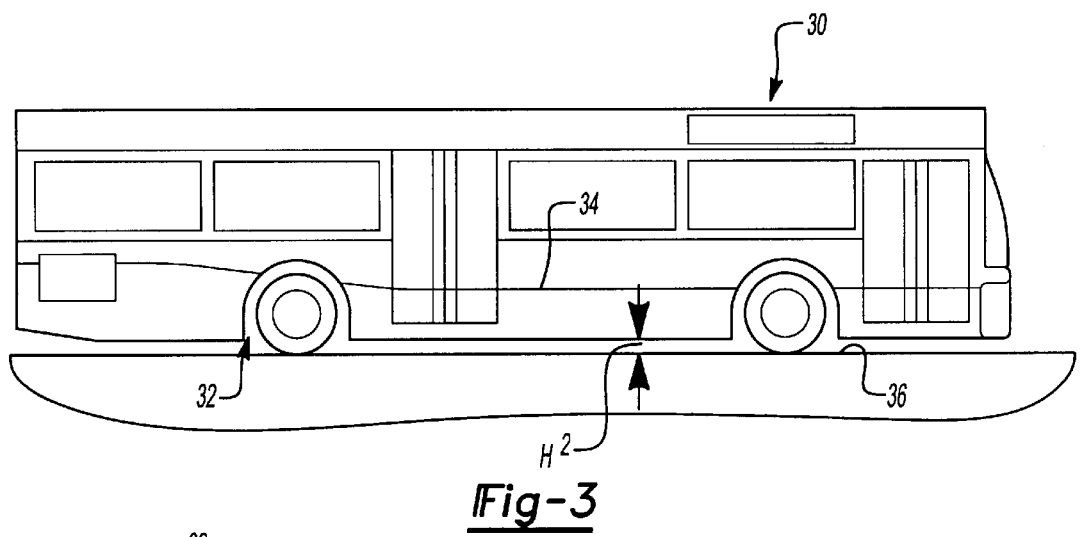
FIG. 3 a side view of a vehicle with a drive unit assembly incorporating the subject invention.

In order to facilitate ingress and egress from vehicles such as buses, trolley cars, etc. the floor profile should be lower to the ground. A vehicle 30 with an improved drive unit assembly 32 is shown in FIG. 3. The drive unit assembly 32 includes a unique compact gear reduction assembly (shown in FIG. 7) that allows the floor profile to be lower than traditional floor profiles. The subject drive unit assembly 32 defines a floor profile having a height H2 between a vehicle floor 34 and the ground 36 that is less than 400 mm.

Figure 4:
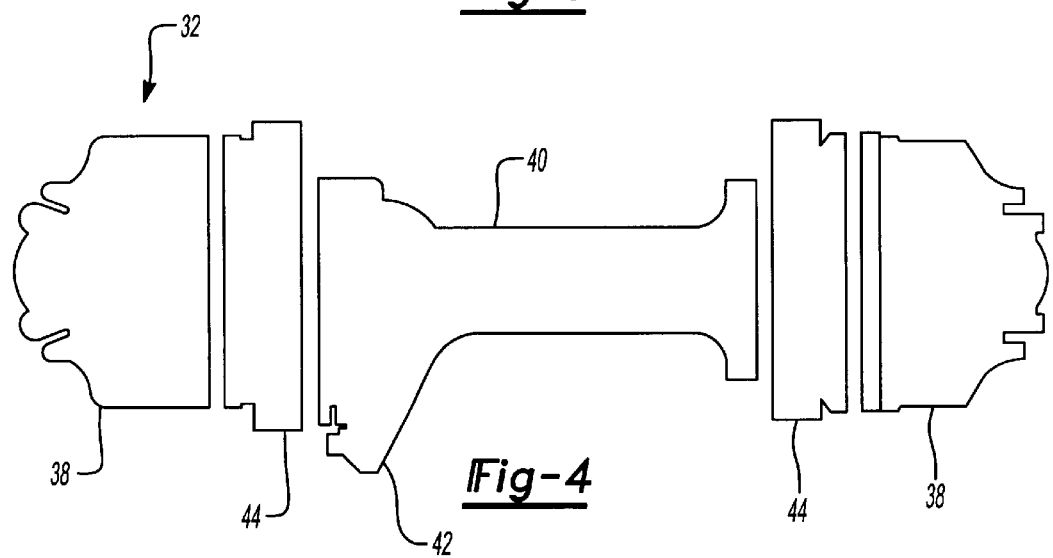
FIG. 4 is a partial exploded view of the axle assembly of FIG. 3.

The drive unit assembly 32 includes a pair of wheel end assemblies 38 interconnected by an axle housing 40, shown in FIG. 4. A single input assembly 42 is positioned at one end of the axle housing 40 and is used to drive both wheel end assemblies 38. A compact gear reduction assembly 44 is mounted to each wheel end assembly 38 to transfer load from the input assembly 42 to the wheel end assemblies 38.

Figure 5:
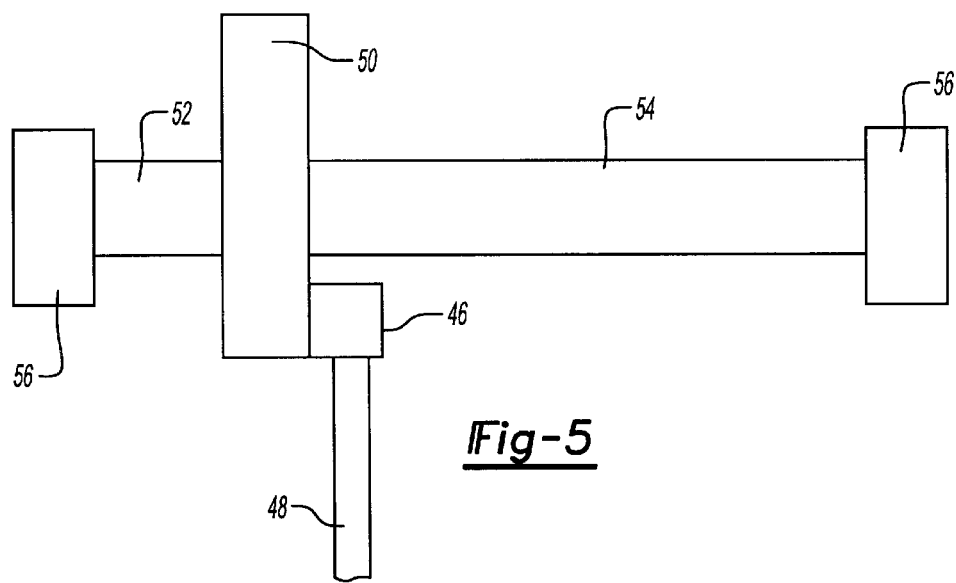
FIG. 5 is schematic view of an input drive assembly for the axle of FIG. 4.

In the typical portal axle configuration, the input assembly 42 includes an input pinion gear 46 that is coupled to a vehicle driveshaft 48, see FIG. 5. The driveshaft 48 receives power from a vehicle engine and transmission (not shown). The pinion gear 46 is in meshing engagement with a ring gear 50 that is coupled to drive a short axle shaft 52 and a long axle shaft 54. The short axle shaft 52 is operatively coupled to a drive gear 56 in one of the gear reduction assemblies 44 and the long axle shaft 54 is operatively coupled to a drive gear 56 in the other gear reduction assembly 44. The drive gear 56 and the short axle shaft 52 drive one of the wheel end assemblies 38 and the drive gear 56 and the long axle shaft 54 drive the other wheel end assembly 38.

Figure 2:
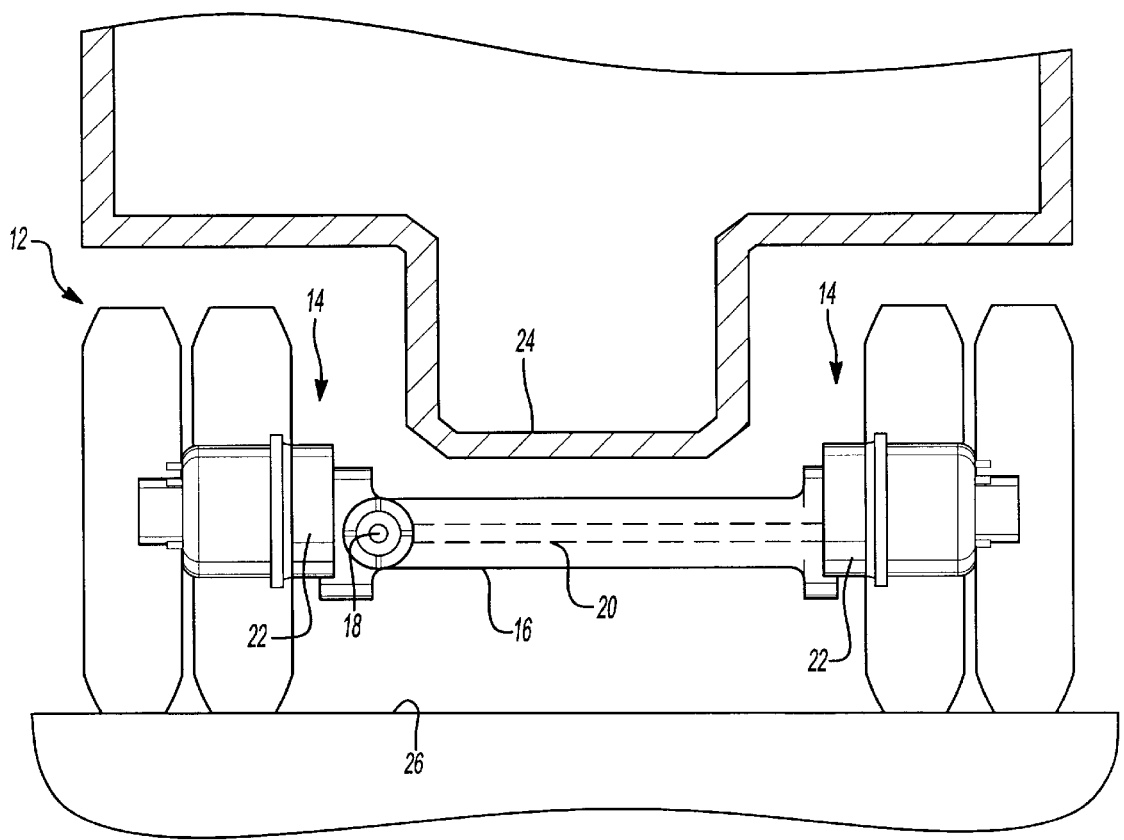
FIG. 2 is a schematic cross-sectional view as indicated at line 2 of FIG. 1.
Figure 6:
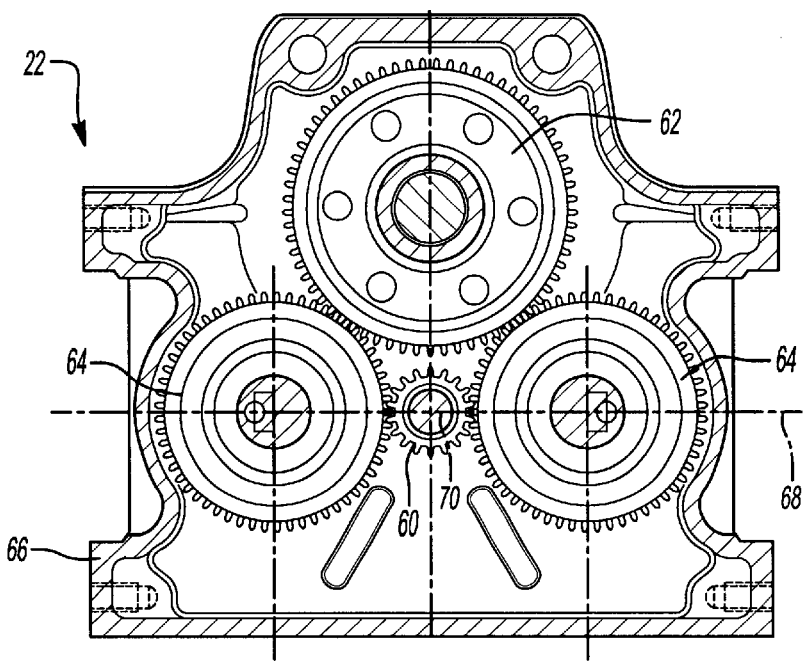
FIG. 6 is a cross-sectional view of a prior art helical gear reduction assembly.

A cross-sectional view of the known gear reduction assembly 22 of FIG. 2 is shown in FIG. 6. These traditional gear reduction assemblies 22 each include a drive gear 60, a driven gear 62, and a pair of idler gears 64 that are all mounted within a gear housing 66. The drive gears 60 are operatively coupled to the axle shafts 20 and the driven gears 62 are operatively coupled to the wheel end assemblies 14. The idler gears 64 intermesh with the drive 60 and driven 62 gears to transfer load.

As shown in FIG. 6, in the traditional configuration, the idler gears 64 define a common idler gear centerline 68 that extends from the center of one idler gear 64 to the center of the other idler gear 64. The drive gear 60 defines a drive gear centerline 70 that is collinear with the idler gear centerline 68. Thus a common line extends through the centers of both idler gears 64 and the drive gear 60. The center-to-center distance between the drive 60 and driven gear 62 is limited by the relationship resulting from the idler gears 64 and drive gear 60 having a common centerline.

Figure 7:
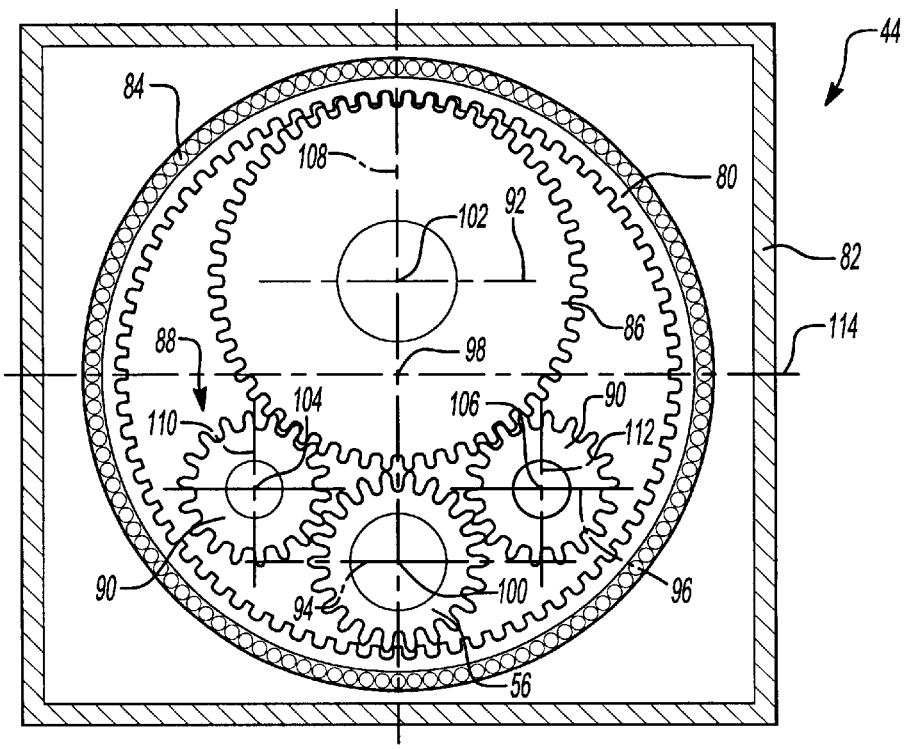
FIG. 7 is a cross-sectional view of a gear reduction assembly incorporating the subject invention.

The subject gear reduction assembly 44 is shown in cross-section in FIG. 7. Each gear reduction assembly 44 includes an inner-toothed ring gear 80 that is rotatably supported within a gear housing 82 on a bearing assembly 84. The drive gear 56, see FIG. 5, serves as the input to the gear reduction assembly 44 and is in meshing engagement with the ring gear 80. A driven gear 86 is also in meshing engagement with the ring gear 80 and is operatively coupled to drive the wheel end 38. An idler gear assembly 88 is interposed between the drive 60 and driven 62 gears. The idler gear assembly 88 preferably includes at least two (2) idler gears 90 that are in meshing engagement with both the drive 60 and driven 62 gears to transfer load between the gears 60, 62. The idler gears 90 are rotatably supported with respect to the gear housing 82.

The driven gear 86 defines a driven gear centerline 92 and the drive gear 56 defines a drive gear centerline 94. The idler gears 90 define a common idler gear centerline 96 that extends from the center of one idler gear 90 to the other idler gear 90. The idler gear centerline 96 is parallel and spaced apart from both the driven gear centerline 92 and the drive gear centerline 94. This configuration provides the drive gear 56 at a vertically lower position relative to the driven gear 86 than the idler gears 90. Thus, the centers of the drive 56 and driven 86 gears are farther apart than traditional configurations, which provide more flexibility in gear size and mounting configurations.

The ring gear 80 defines a ring gear axis of rotation 98, the drive gear 56 defines a drive gear axis of rotation 100, the driven gear 86 defines a driven gear axis of rotation 102, and each of the idler gears 90 define respective idler gear axes of rotation 104, 106. Each of the axes of rotation 98, 100, 102, 104, 106 are parallel to each other and are spaced apart from each other, i.e. none of the axes 98, 100, 102, 104, 106 are collinear. Thus, the input drive gear 56 and the output driven gear 86 are rotating within a ring gear 80 similar to a planetary gear configuration but are non-concentric. Further, neither the input 56 nor output gear 86 are concentric with the ring gear 80.

The driven gear 86 defines a vertical centerline 108 that is common with a vertical centerline with the drive gear 56, i.e. the vertical centerline 108 extends from the center of the driven gear 86 to the center of the drive gear 56. The idler gears 90 define vertical centerlines 110, 112 that are spaced apart from and parallel to the vertical centerline 108 of the drive 56 and driven 86 gears.

The ring gear 80 defines a ring gear centerline 114. In the configuration shown in FIG. 7, the centers of both idler gears 90 and the center of the drive gear 56 are positioned on one side of the ring gear centerline 114 while the center of the driven gear 86 is positioned on the opposite side of the ring gear centerline 114. This configuration allows the size of the driven gear 86 to be significantly larger than the drive gear 56.

A desired gear reduction is achieved by varying the size/number of teeth on the drive gear 56, driven gear 86, and ring gear 80. Preferably, the drive gear 56 is smaller than the driven gear 86, i.e. the drive gear 56 has a fewer number of teeth than the driven gear 86, to provide increased torque output at the wheel.

The subject invention utilizes the benefits of a planetary gear assembly for a non-concentric input/output. The subject gear reduction assembly 44 uses a ring gear 80 but places the sun gear or drive gear 56 in meshing engagement on one side of the ring gear 80. The output gear or driven gear 86, which is larger than the drive gear 56 and proportional to the desired reduction, is also in meshing engagement with the ring gear 80. The idler gears 90 are rotatably mounted to the gear housing 82 such that they are in meshing engagement with both the drive 56 and driven 86 gears. The drive 56 and driven 86 gears run on the pitch line of the ring 80 and idlers 90 such that the load is equally distributed amongst them, negating the need for support bearings. This configuration is preferable to traditional drive/driven gear pairs because three tooth sets are in contact allowing the set to be one-third the size of traditional sets.

While the subject gear reduction assembly 44 has been described as being utilized in a portal axle configuration for a mass transit vehicle, it should be understood that the subject gear reduction assembly 44 could also be used in other vehicle applications. For example, the gear reduction assembly 44 could be used in planetary drive axles for heavy-duty off road applications or could be used for gear reduction in other locations along the vehicle driveline. The gear reduction assembly 44 could also be used in other vehicle types such as on-highway commercial trucks, garbage trucks, and delivery trucks, etc.

The subject invention provides a gear reduction assembly 44 that utilizes the high power density and packaging benefits of a planetary gear reduction and which is easily incorporated into an axle assembly with non-concentric input and output components. This combination provides for floor-to-ground heights of less than 400 mm in mass transit applications. This significant lowering of the vehicle floor facilitates the ingress and egress of passengers. This combination also provides a more compact assembly that could replace traditional gear reduction assemblies and increase available packaging space for other vehicle components.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gear drive assembly for driving a vehicle wheel of a drive axle assembly comprising:
   a drive gear defining a drive gear centerline;
   an idler gear assembly in meshing engagement with said drive gear and defining an idler gear centerline that is different then said drive gear centerline; and
   a driven gear in meshing engagement with said idler gears to drive a vehicle wheel about a wheel axis of rotation wherein said driven gear defines a driven gear axis of rotation that is concentric with said wheel axis of rotation.

2. An assembly according to claim 1 wherein said idler gear assembly includes a pair of idler gears interposed between said drive and driven gears with said idler gear centerline extending from the center of one of said idler gears to the center of the other of said idler gears.

3. An assembly according to claim 2 wherein said driven gear defines a first driven gear centerline that is perpendicular to said idler gear centerline and which extends from the center of said driven gear to the center of said drive gear.

4. An assembly according to claim 3 wherein said driven gear defines a second driven gear centerline that is perpendicular to said first driven gear centerline and spaced apart from said idler gear centerline.

5. An assembly according to claim 2 wherein the center of said drive gear is spaced further apart from the center of said driven gear than the centers of said idler gears.

6. An assembly according to claim 1 including a floating ring gear in meshing engagement with said drive and driven gears.

7. An assembly according to claim 6 wherein said ring gear is supported by at least one bearing for rotation about a ring gear axis of rotation.

8. An assembly according to claim 7 wherein said drive gear defines a drive gear axis of rotation and wherein said drive and driven gear axes of rotation are different than said ring gear axis of rotation.

9. An assembly according to claim 6 wherein ring gear defines a ring gear centerline with the center of said driven gear on one side of said ring gear centerline and the center of said idler gear assembly and the center of said drive gear positioned on an opposite side of the said ring gear centerline.

10. An assembly according to claim 6 wherein said drive and driven gears run on the pitch line of said ring gear and idler gear assembly to equally distribute loading.

11. An assembly according to claim 1 including a non-rotating gear housing fixed to a vehicle structure and mounted between an axle housing and a wheel end assembly that supports said vehicle wheel wherein said gear housing substantially encloses said drive gear, said driven gear, and said idler gear assembly.

12. An assembly according to claim 1 including an input gear assembly operably coupled to drive said drive gear.

13. An assembly according to claim 12 wherein said input gear assembly includes a pinion gear operably coupled to a vehicle driveshaft and rotatable about a pinion gear axis of rotation and wherein said drive gear defines a drive gear axis of rotation that is transverse to said pinion gear axis of rotation.

14. An assembly according to claim 13 wherein said input gear assembly includes a ring gear driven by said pinion gear about said drive gear axis of rotation.

15. A gear drive assembly for driving a vehicle wheel comprising:
   a gear housing;
   a ring gear rotatably supported on at least one bearing for rotation relative to said gear housing about a ring gear axis of rotation;
   an input gear in meshing engagement with said ring gear;
   an output gear in meshing engagement with said ring gear to provide driving output to a vehicle wheel; and
   an idler gear assembly interposed between said input and output gear to transfer load from said input gear to said output gear.

16. An assembly according to claim 15 wherein said idler gear assembly includes a pair of idler gears rotatably mounted with respect to said gear housing and defining a common idler gear centerline extending from the center of one of said idler gears to the center of the other of said idler gears.

17. An assembly according to claim 16 wherein said input gear defines an input gear centerline that is different than said idler gear centerline.

18. An assembly according to claim 17 wherein said output gear defines an output gear centerline that is parallel to said idler gear centerline and parallel to said input gear centerline with said input gear centerline line being spaced farther apart from said output gear centerline by a first distance and said idler gear centerline being spaced apart from said output gear center line by a second distance less than said first distance.

19. An assembly according to claim 16 wherein said input and output gears define a common input/output centerline that is perpendicular to said common idler gear centerline.

20. An assembly according to claim 15 wherein said output gear is greater in size than said input gear to provide gear reduction.

21. An assembly according to claim 15 wherein said gear housing comprises a non-rotating component that is mounted between an axle housing and a first wheel end assembly that supports said vehicle wheel.

22. An assembly according to claim 21 wherein said axle housing extends between said first wheel end assembly and a second wheel end assembly that both rotate with said output gear about a common axis.

23. An assembly according to claim 15 wherein said output gear defines an output gear axis of rotation that is concentric with said vehicle wheel.

24. A drive axle assembly comprising:
   a center axle housing;
   a first wheel end assembly mounted at first end of said axle housing;
   a second wheel end assembly mounted at a second end of said axle housing opposite end from said first end;
   a input gear assembly positioned at said first end of said axle housing for providing driving input to said first and second wheel end assemblies;
   a first axle shaft coupled to said input gear assembly for driving said first wheel end assembly;
   a second axle shaft coupled to said input gear assembly for driving said second wheel end assembly wherein said second axle shaft is longer than said first axle shaft;
   a first gear reduction assembly receiving input from said first axle shaft and providing output to drive said first wheel end assembly; and
   a second gear reduction assembly receiving input from said second axle shaft and providing output to drive said second wheel end assembly wherein said first and second gear reduction assemblies each include a ring gear rotatably supported within a gear housing, a drive gear in meshing engagement with said ring gear, a driven gear in meshing engagement with said ring gear, and an idler gear assembly in meshing engagement with said drive and driven gears such that input is transferred from said input gear assembly to said driven gear via said drive and idler gear assembly.

25. An assembly according to claim 24 wherein said drive gear defines a drive gear centerline and wherein each of said idler gear assemblies includes a pair of idler gears defining a common idler gear centerline extending from the center of one of said idler gears to the center of the other of said idler gears with said idler gear centerline being spaced apart from and parallel to said drive gear centerline.

26. An assembly according to claim 24 wherein said driven gears of said first and second gear reduction assemblies define driven gear axes of rotation and wherein said first and second wheel end assemblies rotate about a common wheel axis of rotation that is collinear with said driven gear axes of rotation.

27. An assembly according to claim 24 wherein said gear housing of said first gear reduction assembly is mounted directly between said first wheel end assembly and said first gear reduction assembly and said gear housing of said second gear reduction assembly is mounted directly between said second wheel end assembly and said second gear reduction assembly.

28. An assembly according to claim 27 wherein said ring gears of said first and second gear reduction assemblies are each supported on a bearing within said respective gear housing.

\* \* \* \* \*